(12) United States Patent
Talanov et al.

(10) Patent No.: US 7,383,907 B2
(45) Date of Patent: Jun. 10, 2008

(54) AIR-CUSHION VEHICLE

(75) Inventors: Alexandr Vasilievich Talanov, Moscow (RU); Jury Borisovich Pribylsky, Moscow (RU)

(73) Assignee: SIA "kurs", Riga (LV)

( * ) Notice: Subject to any disclaimer, the term of this patent is extended or adjusted under 35 U.S.C. 154(b) by 58 days.

(21) Appl. No.: 10/563,352

(22) PCT Filed: Apr. 27, 2004

(86) PCT No.: PCT/RU2004/000158

§ 371 (c)(1),
(2), (4) Date: Jun. 13, 2006

(87) PCT Pub. No.: WO2005/002942

PCT Pub. Date: Jan. 13, 2005

(65) Prior Publication Data

US 2007/0062750 A1    Mar. 22, 2007

(30) Foreign Application Priority Data

Jul. 7, 2003    (RU) .............................. 2003120794

(51) Int. Cl.
*B60V 1/00*    (2006.01)
(52) U.S. Cl. .................. 180/116; 180/117; 180/127
(58) Field of Classification Search ............... 180/117, 180/118, 120, 123
See application file for complete search history.

(56) References Cited

U.S. PATENT DOCUMENTS

| 3,292,721 | A |   | 12/1966 | Dobson |
| 3,401,766 | A |   | 9/1968 | Laufman et al. |
| 3,608,663 | A |   | 9/1971 | Ferguson |
| 3,612,208 | A |   | 10/1971 | Ferguson |
| 3,669,212 | A |   | 6/1972 | Desbarats |
| 3,777,842 | A | * | 12/1973 | Laufman .................... 180/117 |
| 3,869,020 | A |   | 3/1975 | Holland |
| 5,007,495 | A |   | 4/1991 | Yoshida et al. |

FOREIGN PATENT DOCUMENTS

| GB | 2 091 659 A | 8/1982 |
| SU | 768124 | 1/1982 |

* cited by examiner

*Primary Examiner*—Lesley D. Morris
*Assistant Examiner*—Mark A. Scharich
(74) *Attorney, Agent, or Firm*—Ladas and Parry LLP (57) ABSTRACT

A light air-cushion vehicle has a thrust reverser bucket arranged at an output end of an air nozzle, at least one direction rudder having control surfaces at the output end of the air nozzle and at least one direction rudder having control surfaces in a lift contour, a control system for the thrust reverser bucket and a control system for the direction rudders. The direction rudders are kinematically connected to each other and to a steering device. The control surfaces at the output end of the air nozzle turn around an axis in the vertical direction and the control surfaces in the lift contour turn around an axis in the longitudinal direction axis.

8 Claims, 10 Drawing Sheets

AIR-CUSHION VEHICLE

FIELD OF INVENTION

The invention relates to transport means, in particular to light air-cushion vehicles.

BACKGROUND OF THE INVENTION

Designs of light air-cushion vehicles with a single propulsion unit wherein a part of the airflow from the pulling or pushing fan is directed in a cavity of the air chamber in the bottom creating conditions for the vehicle hovering are presently known in the art (for example, patents U.S. Pat. No. 3,869,020, B60V 1/14, 1975 (1), U.S. Pat. No. 5,007,495, B60V 1/14, 1991 (2), U.S. Pat. No. 3,608,663, B60V 1/14, 1971 (3)).

The vehicles with entire airflow from a propelling fan directed in the air cushion chamber are also known (patents U.S. Pat. No. 3,669,212, B60V 1/14, 1972 (4) and U.S. Pat. No. 3,401,766, B60V 1/00, 1965 (5)). At the same time part of the flow can be directed to any side by opening valves of a corresponding side providing rather free maneuvering. "Pulling" power of such vehicles is not big since the pressure in the cushion can not exceed the pressure required for hovering, and when the pressure grows it is released unevenly at all sides. Taking into account that a thrust always exists due to air "sucking in", it is neutral only in case the fan is in horizontal position. When the fan is inclined ahead, the apparatus starts moving in the direction of fan inclination even if the air outflows uniformly along the whole perimeter of the air cushion.

The fan thrust practically can not be balanced with releasing air from the air cushion cavity in the direction providing back thrust, i.e., in reverse (under physics laws), as suggested in (5), though it is possible to control motion and decrease the "direct" thrust down to almost zero.

The motion control in (4) with rudders arranged behind the fan is due to eccentricity of the thrust in relation to the longitudinal axis of the apparatus, and the effectiveness of the control as well as the entire propulsion complex is extremely low.

A technical solution according to reference (3) is known, wherein the control surfaces are placed directly behind the fan in the propulsion duct at the front of the apparatus, and there are rudders at its stem. In usual conditions the apparatus has good characteristics of controllability at cruising regime and acceleration mode.

Direct thrust can be almost zero if the thrust duct is completely closed with flaps at the output of the duct; however in such case the control over the apparatus is lost.

Another design of a light air-cushion vehicle is known from (2). In this case control of motion direction is provided by a single multilink bucket reversing device. This solution is also characterized by complete absence of clarity how to control the apparatus in the mode of "reverse". What is more, control characteristics of the apparatus can be so nonlinear that it would be technically impossible to control apparatus motion.

The coefficient of the back thrust of the reversing devices is well investigated in aviation. It is not more than 0.4 even in case of thorough engineering (it is 0.35 for NK-8-2U engine of TU-154 airplane). It can even be zero in "short" apparatus like the one described in (2). An attempt of complex solution of controlling and reversing problems is in source (1). Here there is theoretical possibility to control the direction of motion at complete thrust reversing in reversing flap position shown in FIG. 13 due to release of flaps "142" and "146" though release of the control flaps decreases back thrust and possibly leads to a side force at the apparatus body contrary to the desired result due to the effect of aerodynamic "curvature" of the apparatus erection profile. It is especially dangerous at high speed as the relation is nonlinear.

The review of the known designs of air cushion apparatuses shows the following:

1. None of the designs solves the problem of apparatus thrust control satisfactorily (from maximum positive to maximum in reverse direction).

2. None of the designs offers a solution of the problem of quality apparatus position control in braking mode at high speed.

3. None of the solutions is suitable for position and motion direction control at zero or close to zero speed, at the same time providing satisfactory thrust and propulsive efficiency of the moving device.

SUMMARY OF THE INVENTION

The objective of the present invention is to offer a light air-cushion vehicle free of the disadvantages of the known vehicles discussed above, particularly in the sphere of their control.

The characteristic feature of a light air-cushion vehicle is its "flat" motion along support surface with minimum (close to zero) resistance in desired as well as in another direction. The only source of control action is the thrust of the light air-cushion vehicle propulsion complex (including propelling and lift contours). It is especially important at zero or close to zero speed when action of aerodynamic forces on the vehicle body and special aerodynamic surfaces is insignificant. The problems of position and motion direction control for large air-cushion vehicles are solved by installing turnable propulsion complexes and reversing propeller thrust. However such solution is unacceptable for mass production of a household or sports light air-cushion vehicle where a single fan driven by a single engine is the source of both thrust and lift. Besides the problems of speed control and motion direction control the others include obtaining optimum dynamic motion characteristics, such as speed, acceleration and slowing down, speed and acceleration of angular motion (rotation around a vertical axis), as well as maximum side acceleration when changing the direction of motion.

End-to-end solution of all problems of motion dynamics for a light air-cushion vehicle is also connected to the task of minimizing vehicle weight and acceptable propulsion efficiency of the vehicle.

According to the present invention an air-cushion vehicle comprises a body, an elastic enclosure forming a lifting chamber with the body bottom, a propelling fan, an internal combustion engine for driving said fan (3), propelling and lift contours which are divided by a ridge which is used for guiding an air flow from the fan to said contours, an air nozzle of the propelling contour, a thrust reverser bucket arranged at the output of the air nozzle, a vehicle control system comprising a thrust reverser bucket control system and a control system of rudders which are disposed at the nozzle output section and in the lift contour, said rudders being kinematically connected to each other and to said vehicle control system.

Preferably the propelling contour nozzle is flat.

The cylindrical surface of the thrust reverser bucket can be made with slots for separating solid particles and liquid drops and protecting the crew from back action of the reactive air jet.

Preferably the direction rudders at the cut of the nozzle are turnable around a vertical axis and the direction rudders in the lift contour are turnable around longitudinal axis of the vehicle.

It is desirable that the kinematics link of the direction rudders at the cut of the nozzle with the direction rudders in the lift contour is such that a deflection of the direction rudders at the cut of the nozzle is delayed in relation to the deflection of the direction rudders in the lift contour at the initial stage of their activation by the steering device.

BRIEF DESCRIPTION OF THE DRAWINGS

The advantages and characteristics of the air-cushion vehicle according to the invention are disclosed in the description of the examples of embodiment with references to the following drawings.

DETAILED DESCRIPTION OF THE INVENTION

The light air-cushion vehicle (LACV) of chamber design (FIGS. 1-7) consists of a platform-base 1 of relatively small height (8-20% of the vehicle length) with an elastic enclosure 2 along the perimeter of the platform forming with the bottom of the platform a lift chamber of the LACV.

Propelling fan 3 is fixed in the front part of the platform; the fan is driven by internal combustion engine 4. The plane of the fan rotation is inclined at an angle of 45°-60° to the horizontal plane. Airflow behind the fan is divided by ridge (5) into an airflow of propelling contour 6 and an airflow of lift contour 7. The airflow of the propelling contour passes through the longitudinal duct limited by U-shaped base of a crew seat and duct 9 in the body of the platform-base. The airflow of the propelling contour is ejected through flat nozzle 8 at the rear part of the LACV; said nozzle has the ratio of nozzle height "A" to its width "B" of 0.5-0.25. The axis of the flow leaving the nozzle is inclined at 4°-10° upward from the horizontal plane. Thrust reverser bucket 12 turnable around traverse axis 10 to an angle sufficient for complete closure of the airflow of the propelling contour and reversing the air flow to create back thrust (reversing thrust).

Direction rudders 13 (front control surfaces) are arranged in the airflow duct of the lift contour. In the duct of the propelling contour at the cut of the nozzle also there are direction rudders 14—nozzle control surfaces. Both front 13 and nozzle 14 control surfaces are placed at a maximum possible distance along axis "X" from the center of gravity 15 of the LACV.

Figure 1:
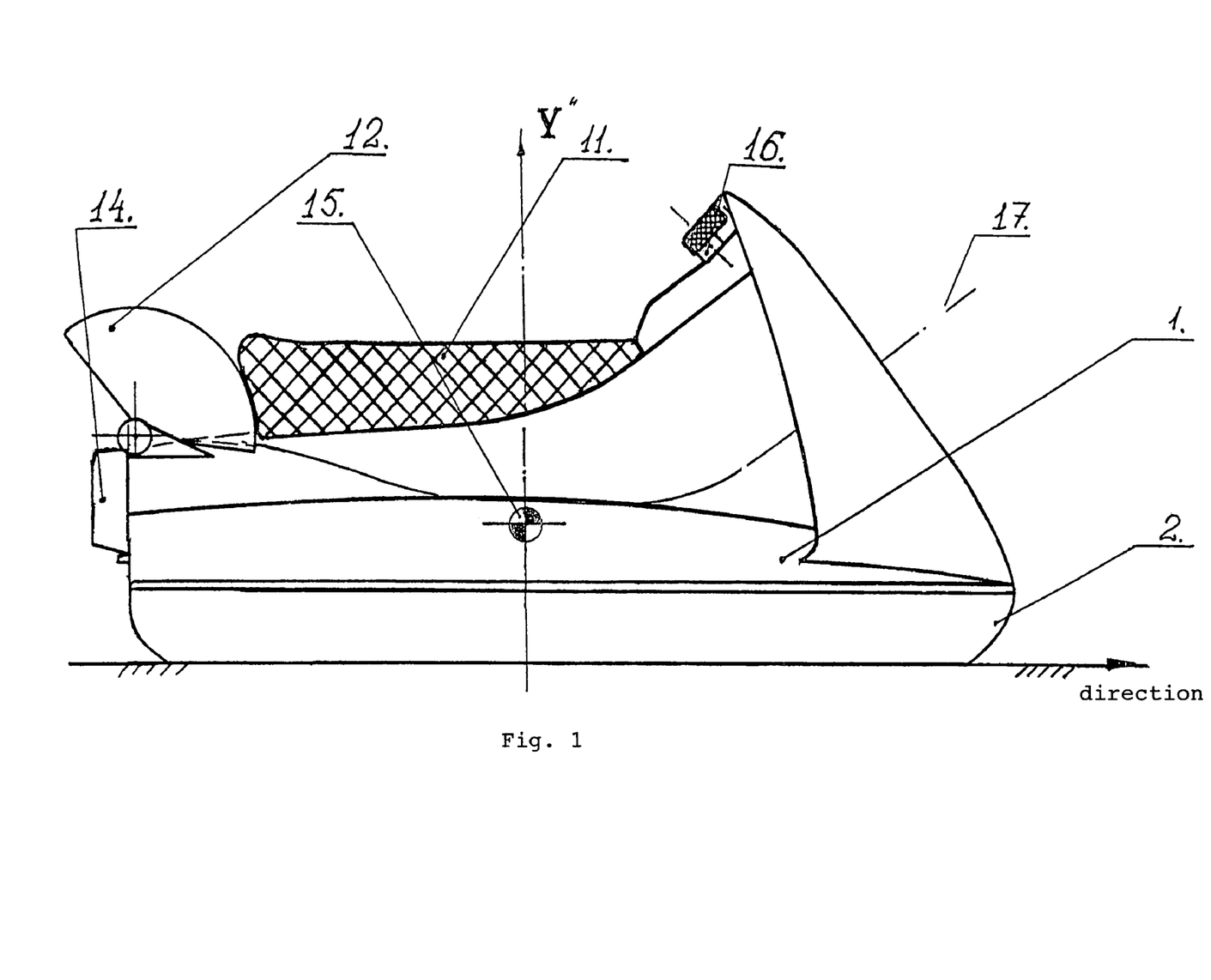
FIG. 1—side view of the air-cushion vehicle according to the invention.
Figure 2:
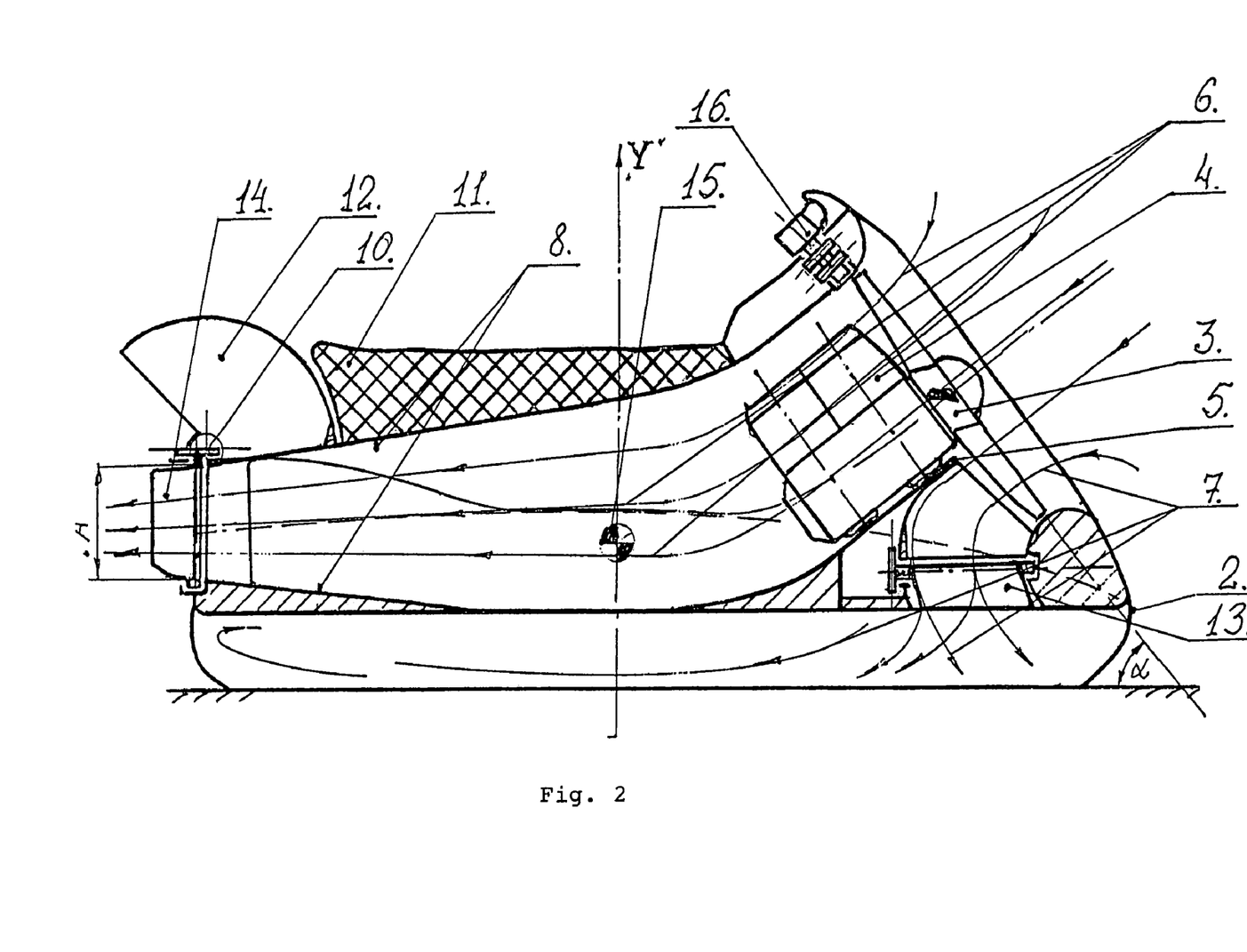
FIG. 2—cross section of the side view in FIG. 1.
Figure 3:
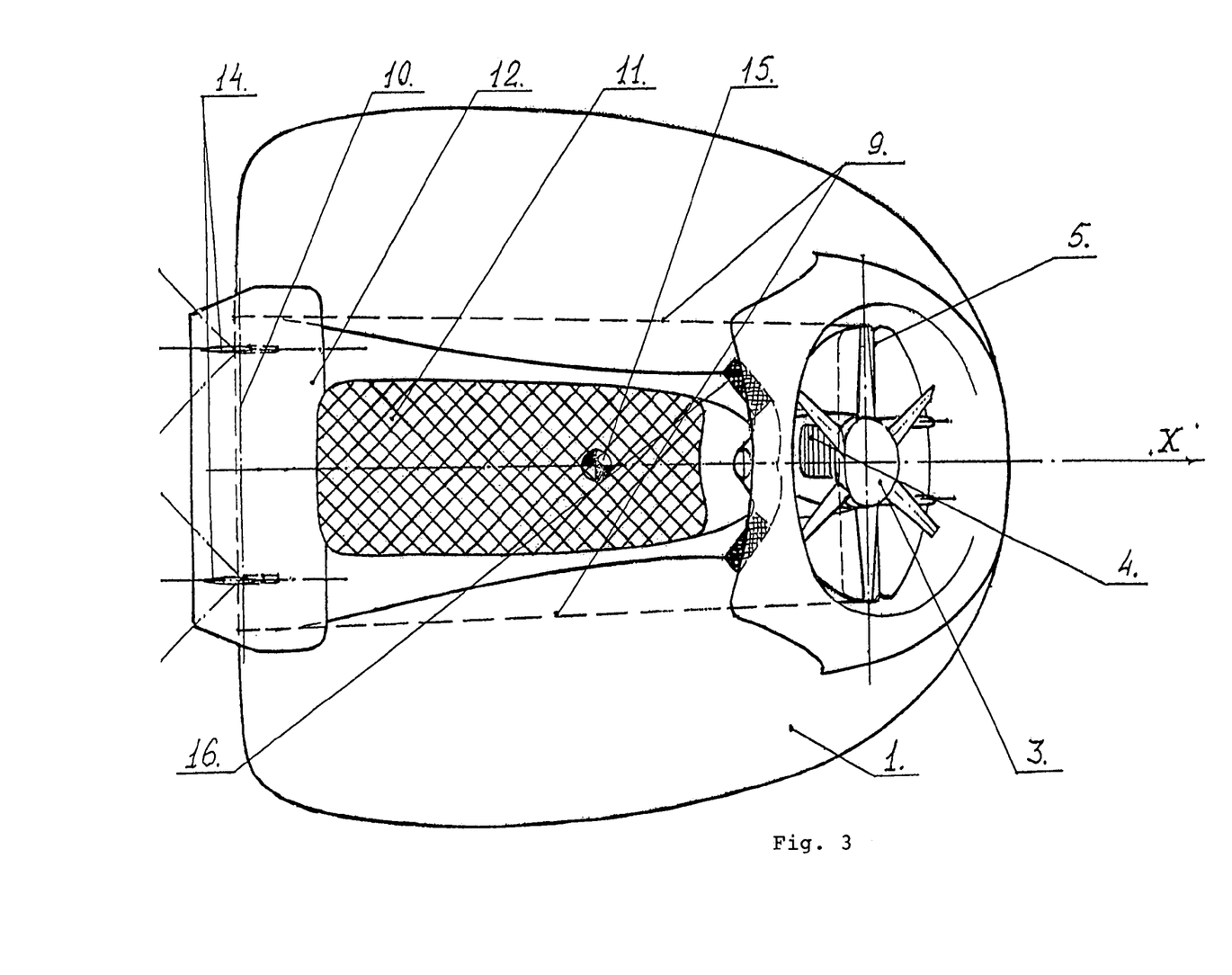
FIG. 3—view from above of the air-cushion vehicle according to the invention.
Figure 4:
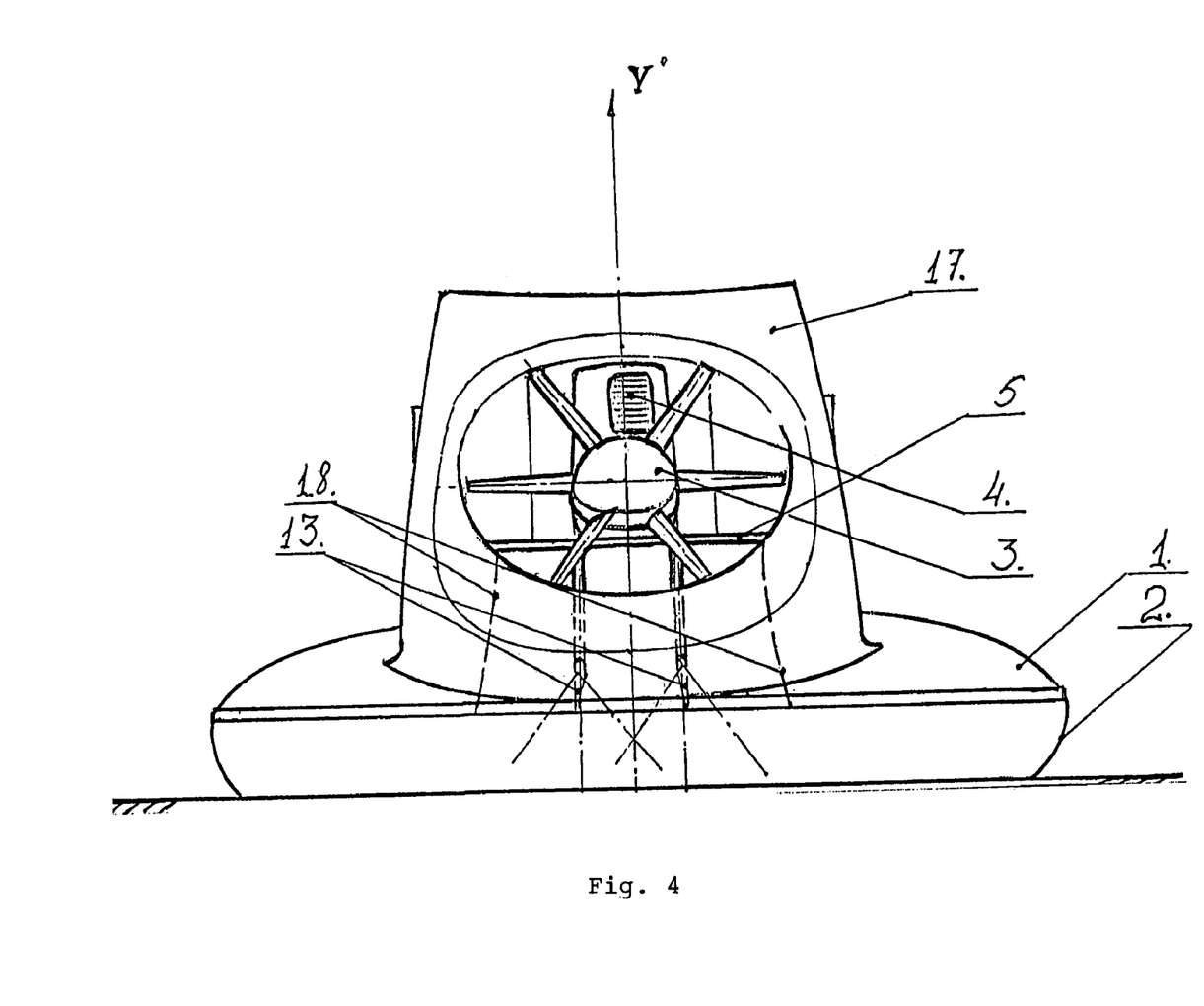
FIG. 4—front view of the air-cushion vehicle according to the invention.
Figure 5:
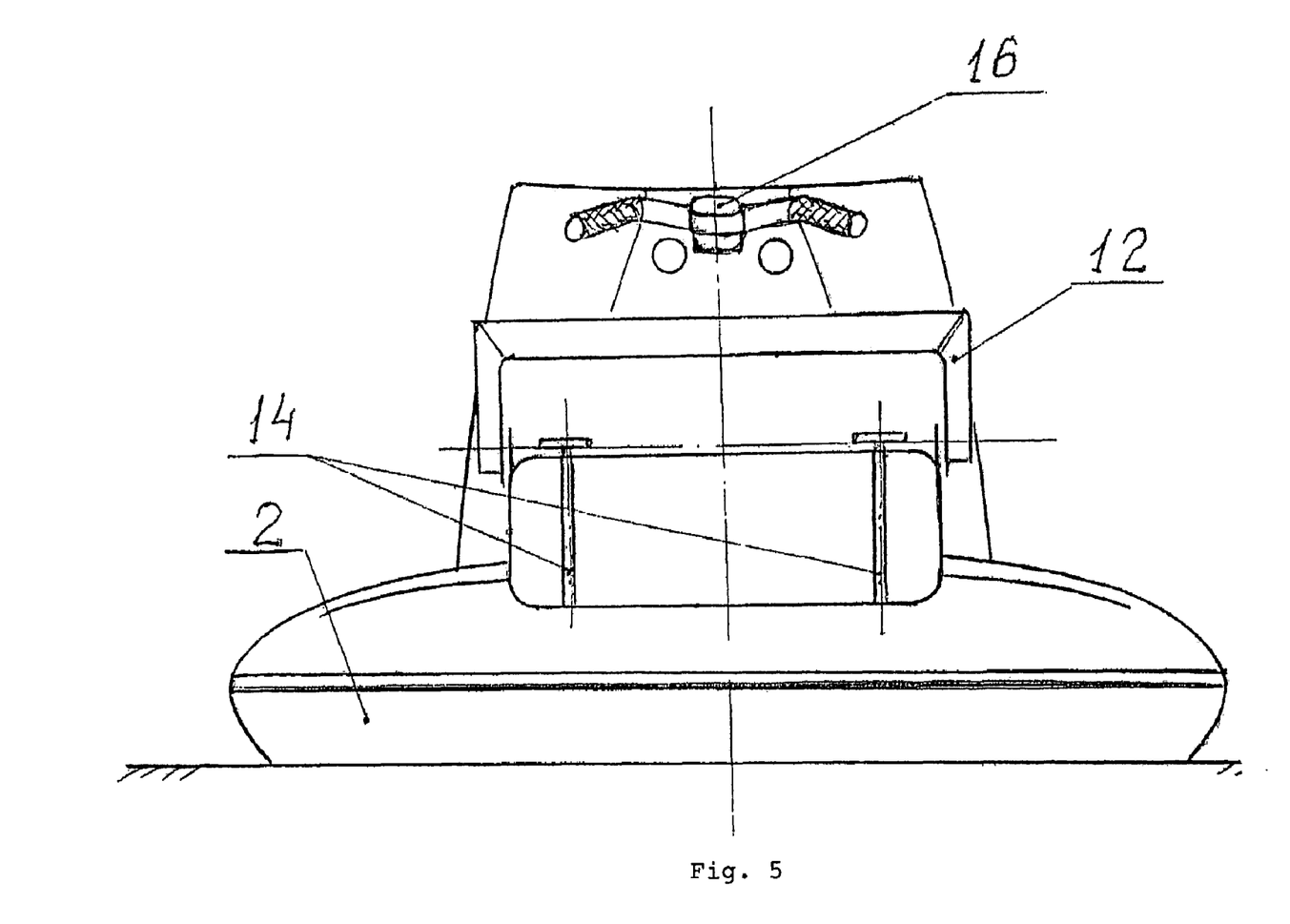
FIG. 5—rear view of the air-cushion vehicle according to the invention.
Figure 6:
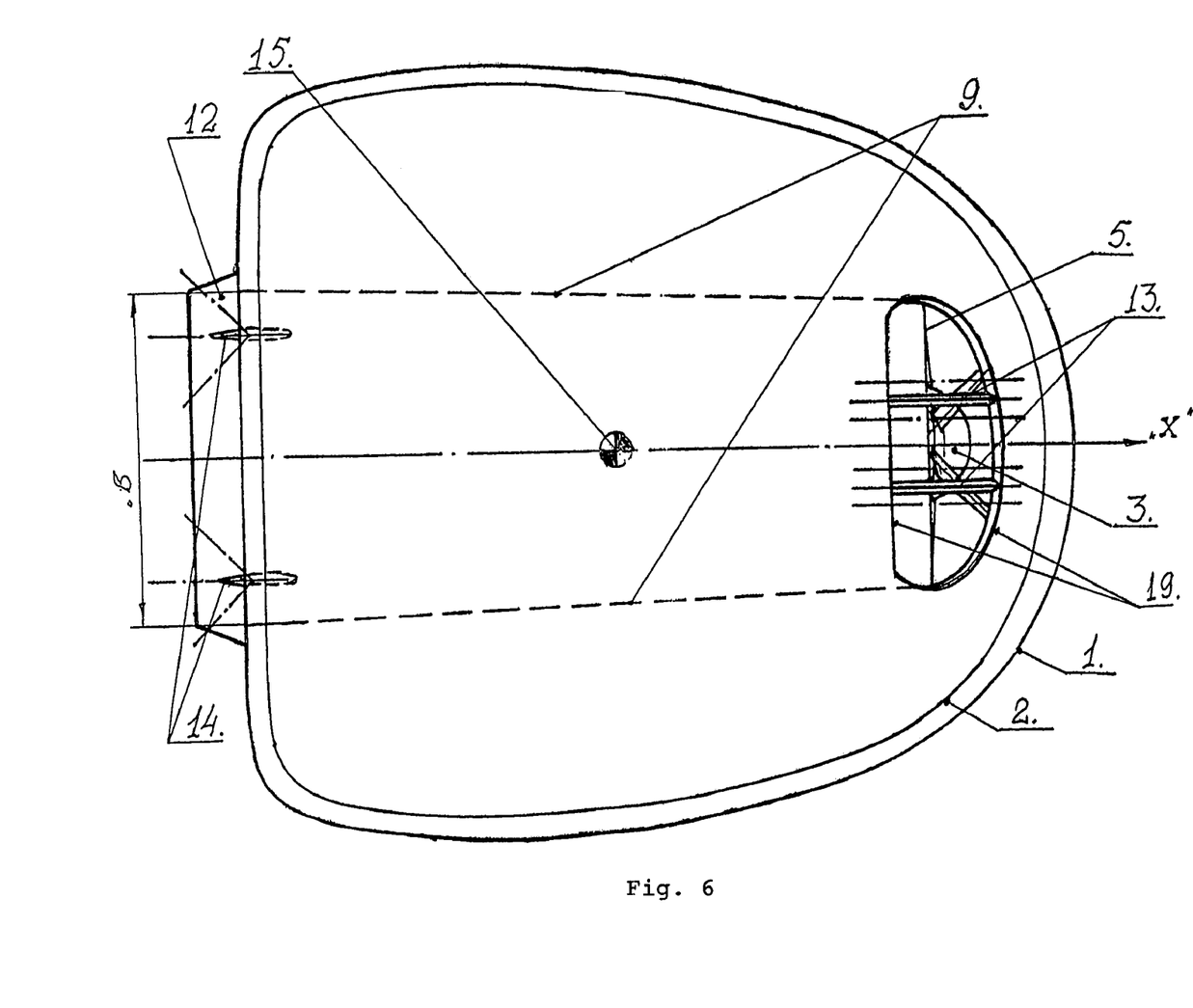
FIG. 6—view from beneath of the air-cushion vehicle according to the invention.
Figure 7:
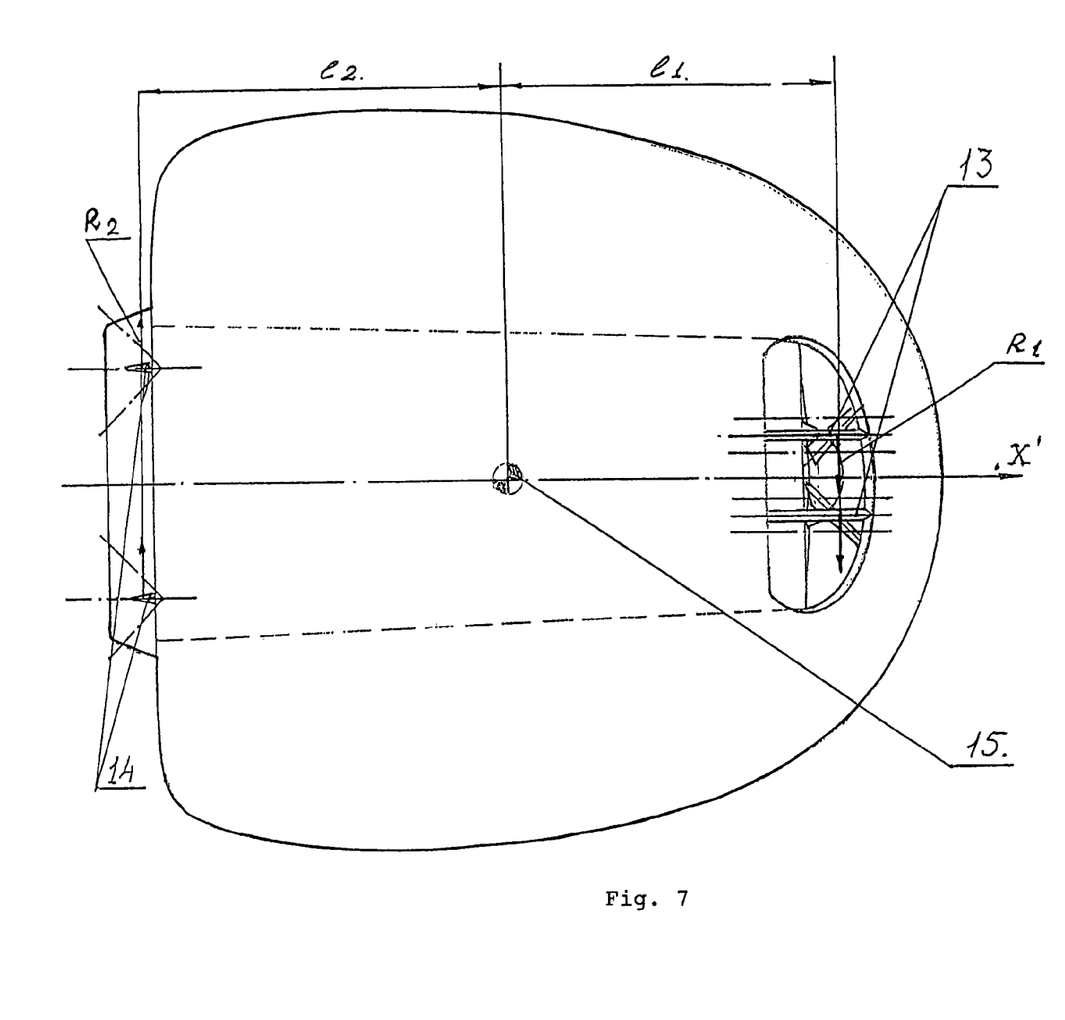
FIG. 7—view from beneath of the air-cushion vehicle according to the invention, with indication of control torque arms ($1_1$—front rudder arm, $1_2$—rear rudder arm)

There is a front aerodynamic panel 17 having the functions of an inlet of the fan and a crew protection screen. In FIG. 4 lift contour 18 is shown in a dotted line. In FIG. 6 numeral 19 denotes an outlet opening of the lift contour duct into the lift chamber.

The crew takes seats 11 arranged longitudinally.

The airflow from fan 3 is divided by ridge 5 into two paths. The flow of propelling contour creates a thrust required for the horizontal motion. The thrust flow vector can be inclined in horizontal plane with the help of air rudders 14 to create turning moment around the vertical axis passing through the center of gravity 15 of the vehicle. The created moment is equal to the product of the force applied to direction rudders 14 and the arm of the force.

Besides the above turn, the vehicle can also be turned around the transverse axis of the vehicle in the vertical plane by deviating reverse bucket 12 to an angle of up to 180° providing fluent thrust change from full positive to full negative value at any mode of engine operation.

The lift contour 7 flow is directed from the dividing ridge 5 to the duct of the lift contour and then into the air-cushion chamber limited by the elastic enclosure 2 of the chamber and the lower part on the platform base 1. Excess pressure in the air-cushion chamber due to slowing down the flow of lift contour 7 provides for lifting and hovering of the LACV.

Front (nose) control surfaces 13 are provided in the lift contour duct. The forces acting on the control surfaces 13 are directed to the side of vehicle turn determined by the driver and opposite in sign to the forces on the nozzle control surfaces. The control moment of the forces of the front surfaces is equal to a product of these forces and their arms relative to the vertical axis of the LACV passing through the center of gravity 15 of the LACV. Combined efforts of control forces on surfaces 13 and 14 can be adjusted so that due to changing deflection areas and angles of the control surfaces "pure" control moment is obtained causing only turning around the vertical axis of the vehicle passing through its center of gravity without any side force. The vehicle can reverse at a place and perform accurate maneuvering at a very slow speed close to zero. Synchronized deflection of the control surfaces is initiated by the driver using steering device 16. The synchronized deflection can be provided with two control ropes activated by a single shaft of the steering device 16 through two leads.

Figure 8:
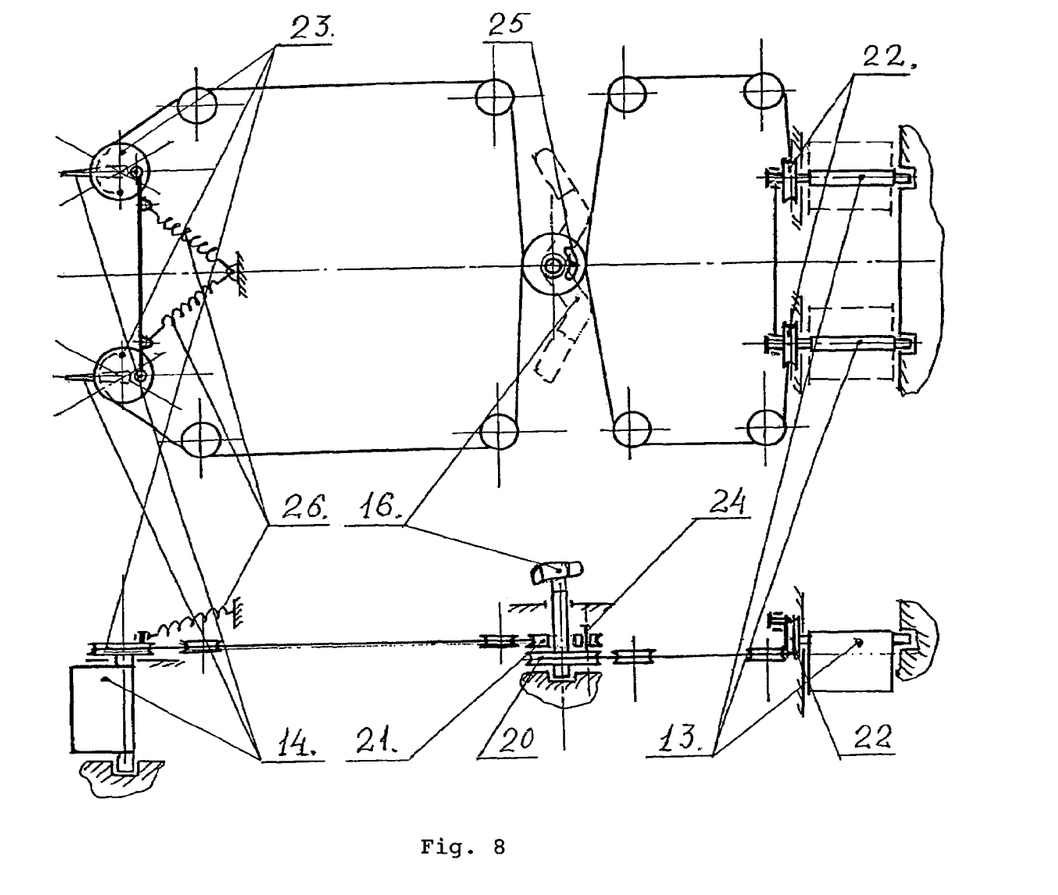
FIG. 8—combined view from above and from a side of the system of thrust reverser bucket control.

As it is shown in FIG. 8, pulley 20 is fixed on the shaft of the steering device 16 and has kinematic connection through the ropes with pulleys 22 of direction rudders 13 of the lift contour. Pulley 21 is arranged on the steering devise 16 shaft turnable related to the shaft. There is a slit in the shape of a ring sector on pulley 21 to accommodate rod 24 which is fixed to the end of pulley 20. Pulley 21 is connected with pulleys 23 of direction rudders 14 mounted at the cut of the nozzle. A strip hingedly connecting pulleys 23 is spring-loaded by springs 26 for keeping direction rudders 14 in neutral position in all cases of rod 14 movement in the slit of pulley 21 not touching the edges. Such design of the control system secures a delay in a deflection of the direction rudders located at the cut of the nozzle relative to the deflection of the direction rudders located in the lift contour at the start of an action from the steering device of the vehicle.

Figure 9:
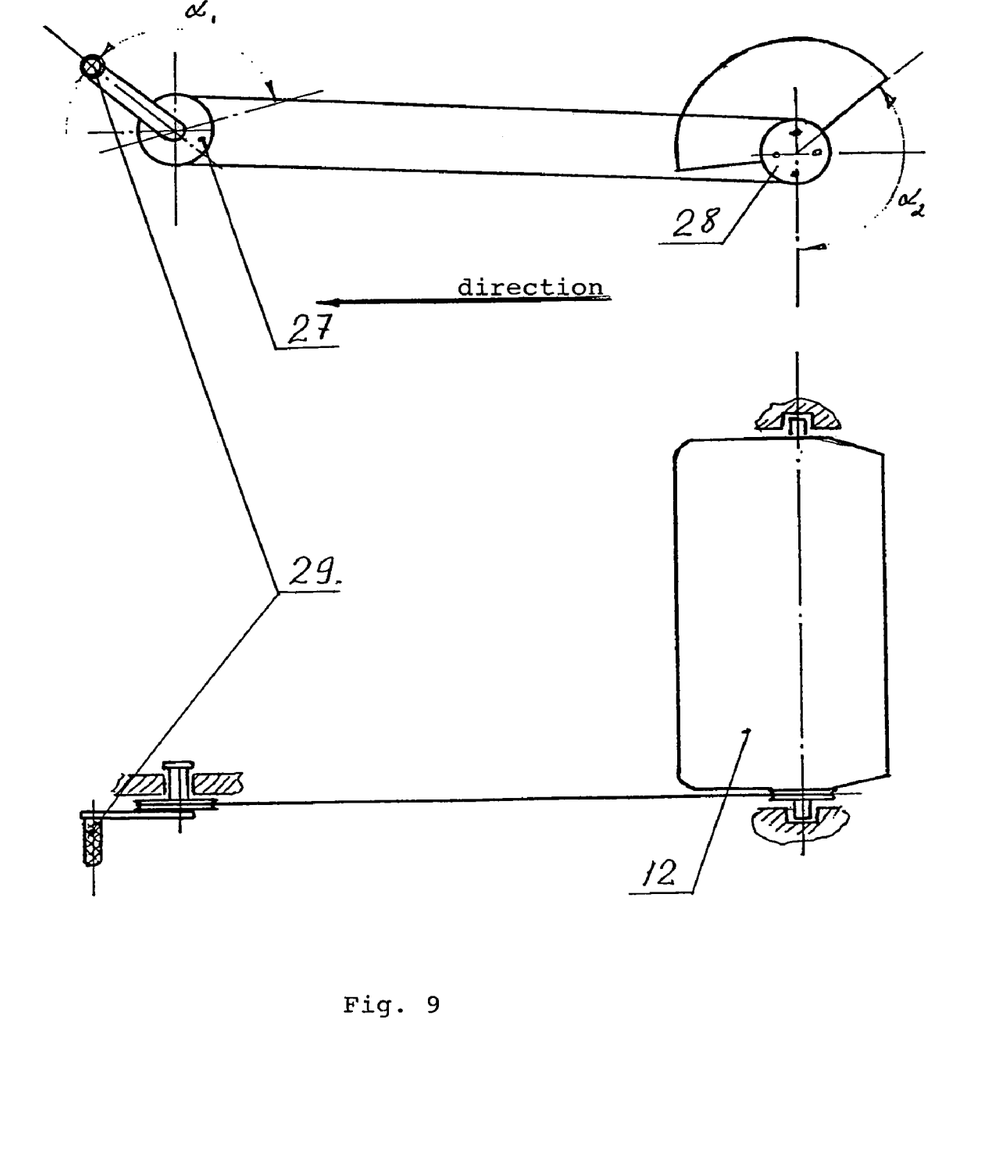
FIG. 9—combined view from a side and from above of the system of direction rudder control.

Reverser bucket 12 is controlled via cable transmission with two pulleys 27 and 28 (FIG. 9) wherein pulley 27 is mounted on the axel of a handle 29 for controlling the thrust reverser bucket, and pulley 28 is mounted on the reverser bucket axel.

The thrust reverser bucket with slotted cylindrical surface (FIGS. 10-11) functions in the following way. The effect of a slotted surface is well known in aviation. A gas jet flowing from a slot at an angle to the surface close to zero "sticks" to a convex side of a surface and deviates with it at a sufficient angle. Loosing kinetic energy due to friction, the gas jet comes off the surface after passing some distance along it. For creating continuous flow along the energy of the surface gas layer needs to be replenished by making the surface with multiple slots (in aviation such are two- and three-slot plane flaps).

Figures 10, 11:
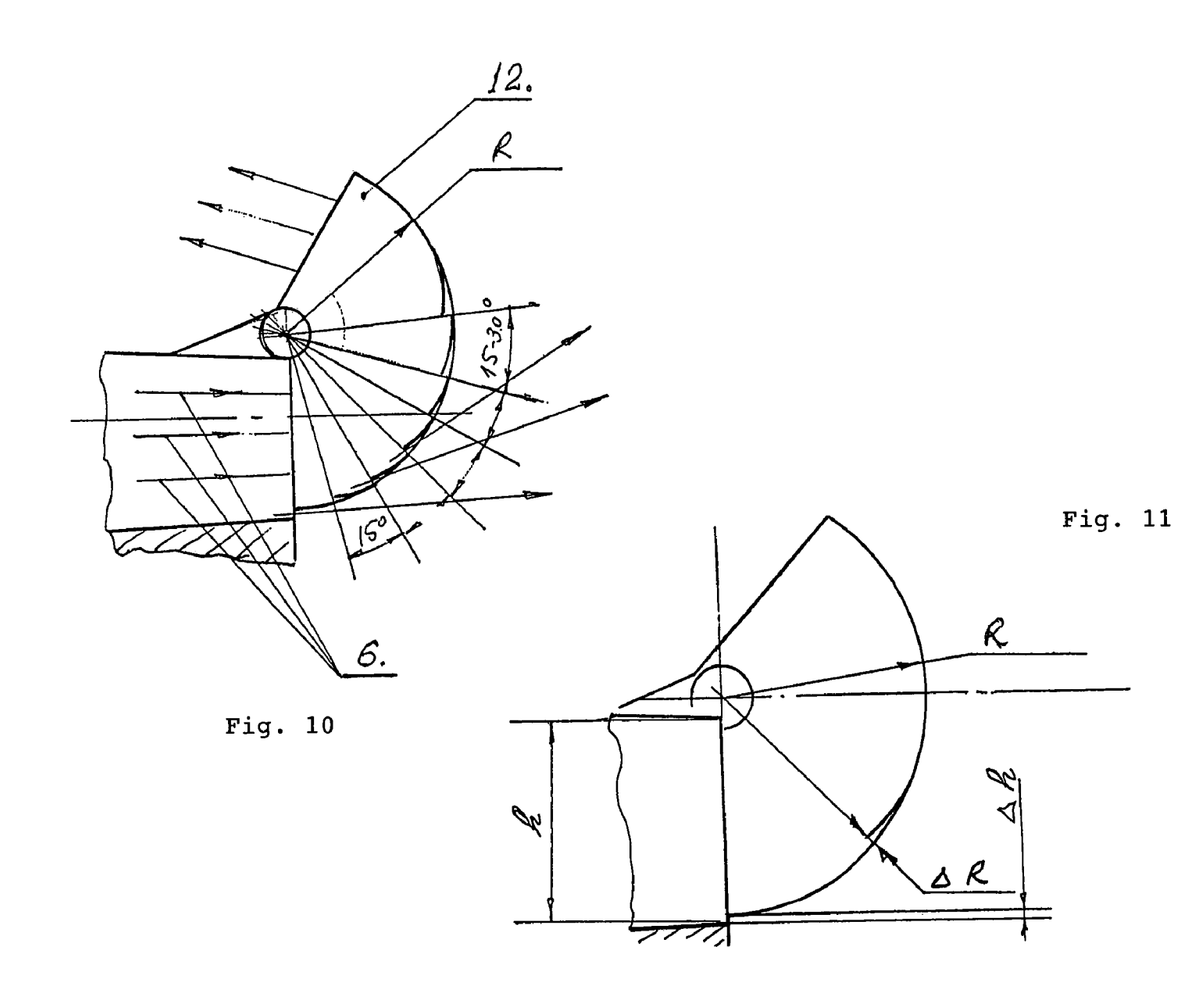
FIGS. 10 and 11—side view of the thrust nozzle and the thrust reverser bucket.

The surface of the reverser bucket of such type provides for separation of solid particles and liquid drops to prevent their entering the crew zone as well as decreasing dusting (or snowing ) this zone during reverse braking.

Designations:

"T"—trajectory of solid particles and liquid drops.

"R"—outer radius of the reverser bucket generatrix; said radius is chosen marginally sufficient to have delta H within the range of 0.5-2% H, where H is a nozzle height at the cut.

Delta R—a value of the internal bend of a single slot element; said value is in the same range as $\Delta H$.

$\alpha$—a sector angle of a single reverser bucket slot element (15°-30°).

If the above parameters are observed, the "reverse thrust" at least does not decrease, and at thorough adjustment of the parameters it increases.

Vehicle Moving Modes

1. Start and maneuvering at zero speed.

The reverser bucket is in an intermediate position when the thrust of deflected air flow balances the forward thrust of the propelling contour thrust.

The engine is tuned to the mode when the vehicle can be "hanging".

Simultaneous deflection of the rudders of the lift and propelling contours at some approximately equal value causes the vehicle to turn around the vertical axis remaining at the place. Further deflection of the rudders with increasing engine power leads to more intensive turning. It should be remembered that the power directed in the "lift" contour of LACV is 30-40% of the total power for this mode.

2. Speedup and moving at predetermined speed.

The reverser bucket is deflected ahead from the "hanging" position. Each move up to the stop corresponds to certain speed. Speed also depends on an engine operational mode which is changed from the minimum one sufficient for "hanging" to the maximum one corresponding to the highest acceleration and highest speed.

Controlling the Direction of Motion

Deflection of steering device 16 leads at the first phase to deflection of the lift contour rudders in the front part of the vehicle. The effort on the lift contour rudders causes some movement of the head and entire vehicle in the direction of the turn with simultaneous turn around the vertical axis. The thrust vector turns to the turn direction with corresponding decrease of the turn radius.

It should be noted that angle velocity and acceleration are kept the same in any position of the reverser bucket, and their maximum values are by 40-65% more than for any of the vehicles cited above since improved characteristics correspond to additional power of the lift contour.

Braking

There are two methods of braking which can be applied at any speed.

a. Slowing down the engine (up to zero), which correspond to "rough", or emergency braking.

b. Deflecting the reverser bucket to the "reverse" position. Braking will be more effective at higher mode of engine operation.

It should be noted that braking is more effective at higher speed. Since reverse jet produces "jet effect" at the body of the vehicle, the body is pressed to the surface and slows down due to friction forces and additional "inductive" resistance.

Reverse motion

The proposed reversing method of (single-bucket with pure non-impact inlet and outlet) provides for a high coefficient of reversing (up to 0.45) allowing the vehicle at initial thrust-to-weight ratio of 0.2 and higher not only move backward but also to climb a slope of 3°-4° though it is not a basic mode.

It is obvious that though this description and the particular examples characterize the preferable embodiment of the invention, they are given only for the purpose of illustration and not to be considered limiting the scope of the present invention.

The invention claimed is:

1. A light air-cushion vehicle comprising
   a body having on the body a steering device, a body bottom, an elastic enclosure forming with the body bottom a lifting chamber defining a vertical direction, a fan, an internal combustion engine for driving the fan, and propelling and lift contours divided by a ridge respectively for guiding an air flow from the fan, and in a longitudinal direction transverse to the vertical direction an air nozzle portion of the propelling contour and to the lifting chamber,
   a thrust reverser bucket arranged at an output end of the air nozzle,
   at least one direction rudder having control surfaces at the output end of the air nozzle and at least one direction rudder having control surfaces in the lift contour, and
   a vehicle control system comprising a control system for the thrust reverser bucket and a control system for the direction rudders,
   wherein the direction rudders are kinematically connected to each other and to the steering device, and
   wherein the control surfaces at the output end of the air nozzle turn around an axis in the vertical direction and the control surfaces in the lift contour turn around an axis in the longitudinal direction axis.

2. The vehicle according to claim 1, characterized in that a contour or at least the output end of the air nozzle is flat.

3. The vehicle according to claim 2, wherein a longitudinal direction end cylindrical surface of the thrust reverser bucket has slots.

4. The vehicle according to claim 2, wherein the control system for the direction rudders delays the turn of control surfaces at the output end of the air nozzle compared to the turn of the control surfaces in the lift contour.

5. The vehicle according to claim 1, wherein a longitudinal direction, end cylindrical surface of the thrust reverser bucket has slots.

6. The vehicle according to claim 5, wherein the control system for the direction rudders delays the turn of the control surfaces at the output end of the air nozzle compared to the turn of control the surfaces in the lift contour.

7. The vehicle according to claim 1, wherein the control system for the direction rudders delays the turn of control surfaces at the output end of the air nozzle compared to the turn of the control surfaces in the lift contour.

8. The vehicle according to claim 7, wherein the control system for the direction rudders delays the turn of the control surfaces at the output end of the air nozzle compared to the turn of the control surfaces in the lift contour.

* * * * *